United States Patent
Johnston et al.

(10) Patent No.: US 6,310,170 B1
(45) Date of Patent: Oct. 30, 2001

(54) COMPOSITIONS OF SILYLATED POLYMER AND AMINOSILANE ADHESION PROMOTERS

(75) Inventors: Robert R. Johnston, Mainz-Kastel (DE); Patrice Lehmann, Vetraz-Monthous (FR)

(73) Assignee: CK Witco Corporation, Greenwich, CT (US)

( * ) Notice: Subject to any disclaimer, the term of this patent is extended or adjusted under 35 U.S.C. 154(b) by 0 days.

(21) Appl. No.: 09/376,123

(22) Filed: Aug. 17, 1999

(51) Int. Cl.$^7$ ................................................. C08G 77/26
(52) U.S. Cl. ............................. 528/38; 526/279; 528/18; 528/34; 528/901; 556/413
(58) Field of Search ..................... 556/413; 528/18, 528/34, 901, 38; 526/279

(56) References Cited

U.S. PATENT DOCUMENTS

| | | |
|---|---|---|
| Re. 35,223 | * 4/1996 | Stein . |
| 3,627,722 | 12/1971 | Seiter ............................. 260/37 |
| 3,632,557 | 1/1972 | Brode ............................. 260/77.5 |
| 3,979,344 | 9/1976 | Bryant et al. ..................... 260/18 |
| 4,067,844 | 1/1978 | Barron et al. ..................... 260/37 |
| 4,222,925 | 9/1980 | Bryant et al. ..................... 260/37 |
| 4,345,053 | 8/1982 | Rizk et al. ....................... 525/440 |
| 4,374,237 | 2/1983 | Berger et al. ..................... 528/28 |
| 4,474,930 | * 10/1984 | Mikami et al. . |
| 4,474,933 | 10/1984 | Huber et al. ...................... 528/26 |
| 4,625,012 | 11/1986 | Rizk et al. ....................... 528/28 |
| 4,645,816 | 2/1987 | Pohl et al. ....................... 528/28 |
| 5,272,224 | 12/1993 | Baghdachi et al. ................ 525/460 |
| 5,322,873 | * 6/1994 | Pohl et al. . |
| 5,354,880 | 10/1994 | Pepe et al. ....................... 556/407 |
| 5,364,955 | 11/1994 | Zwiener et al. ................... 556/418 |
| 5,756,751 | 5/1998 | Schmalstieg et al. .............. 548/110 |
| 5,807,921 | * 9/1998 | Hill et al. . |
| 5,821,326 | 10/1998 | Kurek et al. ..................... 528/332 |

FOREIGN PATENT DOCUMENTS

676 403 A1    10/1995    (EP) .

* cited by examiner

*Primary Examiner*—Robert Dawson
*Assistant Examiner*—Marc S. Zimmer
(74) *Attorney, Agent, or Firm*—Shirley S. Ma

(57) ABSTRACT

Compositions comprising a silylated polymer and an adhesion promoter, the silylated polymer having an inorganic or organic backbone and at least two groups thereon selected from alkoxysilyl, aryloxysilyl, alkyloximinosilyl and silanol groups and the adhesion promoter being a silane adhesion promoter of the formula:

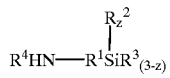

$R^1$ is a branched or cyclic alkylene group, an arylene group or an alkarylene group, any of which may be optionally interrupted by one or more ether oxygen atoms or a (poly)sulfide bridge, provided that $R^1$ has at least 4 carbon atoms; $R^2$ is an alkyl, aryl or alkaryl radical having 1 to 6 carbons; $R^3$ is a $C_1$ to $C_6$ alkoxy group or a $C_3$ to $C_5$ ketoximato group; $R^4$ is hydrogen, a hydrocarbon group, which may optionally be substituted, or a group which will thermally deblock to form an amine group containing the nitrogen atom to which it is attached; and z is 0 or 1.

18 Claims, No Drawings

COMPOSITIONS OF SILYLATED POLYMER AND AMINOSILANE ADHESION PROMOTERS

FIELD OF THE INVENTION

The present invention relates to polymers which can be cured by silane cure chemistry and to compositions made therefrom.

BACKGROUND OF THE INVENTION

Silane cure chemistry is used in different types of polymer technologies and compositions made therefrom, such as silylated acrylics, RTV silicones, silylated polyurethanes, silylated polyethers and others, for crosslinking. Such systems, when the backbones are organic polymers, are often referred to as hybrids, hybrid polymers, hybrid systems, or something similar since they can combine organic polymer chemistry with inorganic (silicon-based) cure chemistry. For this application RTV silicone systems are included in the compositions because they employ similar cure chemistry, even though they typically provide quite different cured properties. It is well known that the type of silane structure located on the polymer for crosslinking directly impacts the composition's properties, such as speed of cure, flexibility, adhesion or mechanical properties like tensile and tear strength at break.

Typical examples for the influence of the silane structure terminating the polymer chain on the system's properties after final cure are given for silylated urethane polymers e.g. in U.S. Pat. No. 4,374,237 to Berger, et al., where curable isocyanate-terminated polyurethanes are at least partially reacted with a secondary amine containing silane monomer having two trialkoxy silane groups. Other silane end-capped urethane polymers and sealants are disclosed in U.S. Pat. No. 3,627,722 to Seiter, which described polyurethane sealants such as alkylaminoalkyltrialkoxysilanes, mercaptoalkyltrialkoxysilanes, and arylaminoalkyltrialkoxysilanes containing a significant percentage, but preferably less than all, of terminal isocyanate groups endblocked with —Si(OR)$_3$, where R was a lower alkyl group.

To overcome the problem of insufficient flexibility, U.S. Pat. No. 4,645,816 to Pohl and Osterholtz teaches a novel class of room-temperature, moisture-curable, silane-terminated polyurethanes bearing terminal isocyanate groups reacted with a silane monomer having one dialkoxy silane group and an organo-functional group with at least one active hydrogen. The polymers are crosslinked to produce elastomeric networks with improved flexibility.

Another approach to reducing the crosslinking density of the cured elastomers, is to use secondary aminosilanes with bulky substituents on the nitrogen as silane endcappers, preferably reacting all free isocyanate endgroups with these secondary amino silanes. EP 676,403 to Feng reports that the use of arylaminosilanes, particularly having one dialkoxy silane group provided the added benefit of further improved flexibility. Zwiener, et al. disclosed in U.S. Pat. No. 5,364,955 similar benefits using certain N-alkoxysilylalkyl-aspartic acid esters. U.S. Pat. No. 4,345,053 to Rizk, et al., describes a moisture-curable silane-terminated polymer prepared by reacting a polyurethane having terminal active hydrogen atoms with an isocyanato organosilane having a terminal isocyanate group and at least one hydrolyzable alkoxy group bonded to silicon. U.S. Pat. No. 4,625,012 to Rizk and Hsieh, describes a moisture-curable polyurethane having terminal isocyanate groups and silane groups having at least one hydrolyzable alkoxy group bonded to silicon, in which the silane groups may be pendant to the chain.

Similar teaching is given for other silane cure hybrid systems. Linear and branched silane terminated polyether polymers are mixed in different ratios to vary flexibility and mechanical properties. RTV silicone crosslinker functionality leads to tailored physical properties.

Improved cure speed of silane terminated polyurethanes using a small amount of amino silane additives such as N-(beta-aminoethyl)-gamma-aminopropyltrimethoxysilane has been shown in U.S. Pat. No. 3,979,344 by Bryant and Weis.

BRIEF SUMMARY OF THE INVENTION

This invention relates to the use of novel aminoalkylsilanes as adhesion promoters that have have a branched linkage to the silicon atom. Preferred silane adhesion promoters employed in the invention have a branched alkylene linkage between the silicon and amino groups thereof.

Inventive compositions employing hybrid polymers and the silane adhesion promoters of the present invention, show comparable to superior adhesion performance as compared to gamma-aminopropylsilane adhesion promoter on conventional substrates such as glass and aluminum. In addition, the compositions have improved flexibility significantly leading to higher elongation, lower modulus and softer sealant materials. The flexibility and adhesion enhancement allow for the realization of performance more nearly like that of RTV silicone sealants for building construction applications using hybrid organic polymer systems such as silylated polyurethanes.

The inventive compositions comprise:
a) a silylated polymer having terminal or pendant alkoxysilyl, aryloxysilyl or alkyloximinosilyl groups thereon; and
b) a silane adhesion promoter of the formula:

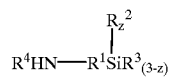

where $R^1$ is a branched or cyclic alkylene group, an arylene group or an alkarylene group, any of which optionally may be interrupted by one or more ether oxygen atoms or a (poly)sulfide bridge, provided that $R^1$ has at least 4 carbon atoms; $R^2$ is an alkyl, aryl or alkaryl radical having 1 to 6 carbons; $R^3$ is a $C_1$ to $C_6$ alkoxy group or a $C_3$ to $C_5$ ketoximato group; $R^4$ is hydrogen, a hydrocarbon group, which may optionally be substituted, or a group which will thermally deblock to form an amine group containing the nitrogen atom to which it is attached; and z is 0 or 1.

The silylated polymers employed in such compositions may be organic or inorganic. Particularly preferred polymers are silylated polyurethanes.

Polyorganosiloxanes having at least two silanol groups may also be used with the adhesion promoters specified above, in which case it is preferred that the composition of polymer and adhesion promoter be prepared at the time of use.

DETAILED DESCRIPTION OF THE INVENTION

The entire disclosures of all U.S. patents and other published documents and any copending U.S. patent applications mentioned anywhere herein are expressly incorporated herein by reference.

Unless otherwise indicated herein, "alkyl" may be linear, branched or cyclic; "aryl" includes alkaryl groups such as tolyl and aralkyl groups such as benzyl; "alkylene" may be linear, branched or cyclic and includes alkylene groups having pendent or internal aryl groups such as 1,4-diethylenephenylene:

or 3-phenyl-1,3-propylene; "arylene" includes arylene groups having pendant alkyl groups; and "alkarylene" refers to a divalent hydrocarbon in which one open valency is aryl and the other is alkyl.

The adhesion promoting silanes of the invention may be represented by the formula:

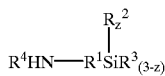

where $R^1$ is a branched or cyclic alkylene group, an arylene group or an alkarylene group, any of which optionally may be interrupted by one or more ether oxygen atoms or a (poly)sulfide bridge, provided that $R^1$ has at least 4 carbon atoms; $R^2$ is an alkyl, aryl or alkaryl radical having 1 to 6 carbons; $R^3$ is a $C_1$ to $C_6$ alkoxy group or a $C_3$ to $C_5$ ketoximato group; $R^4$ is hydrogen, a hydrocarbon group, which may optionally be substituted, or a group which will thermally deblock to form an amine group containing the nitrogen atom to which it is attached; and z is 0 or 1.

$R^1$ suitably contains from 4 to about 12 carbon atoms and is exemplified by branched or cyclic groups such as 1,3-butylene, 1,2-butylene or 2,2-dimethyl-1,3-propylene; 3-methylbutylene, 3,3-dimethylbutylene, 2-ethylhexylene, 1,4-diethylenephenylene, 3-phenyl-1,3-propylene; 1,4-cyclohexylene, and 1,4-diethylenecyclohexylene:

divalent ether and polyether groups of the formula:

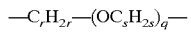

where q is 1–50, preferably 1–5, r and s are integers of 2–6 and at least one —$C_rH_{2r}$— or —($OC_sH_{2s}$)— group is branched; and divalent thioether or polysulfide-containing groups of the formula:

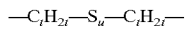

where t is 2–16, preferably 2–4, u is 1–8, preferably 2–4 and at least one —$C_tH_{2t}$— group is branched. Preferred $R^1$ groups are branched alkylene groups of 4–8 carbon atoms.

$R^2$ is exemplified by methyl, ethyl, propyl, isopropyl, butyl, hexyl, phenyl, cyclohexyl, tolyl, and the like. Preferably $R^2$ is not present (z=0) or is a methyl group.

$R^3$ is exemplified by methoxy, ethoxy, isopropoxy, n-propoxy, phenoxy, 2-phenylethoxy, dimethylketoximo, methyl ethyl ketoximo, diethylketoximo, and the like. Methoxy and ethoxy are preferred.

$R^4$ is exemplified by hydrogen, methyl, ethyl, 2-aminoethyl, propyl, 3-aminopropyl, butyl, cyclohexyl, phenyl, methylphenyl, 2-cyanoethyl, isopropoxyethyl, and the like. When $R^4$ is a substituted hydrocarbon group, permissible substituents include cyano, alkoxy and amino. Furthermore, if the formulation employing the adhesion promoter is subjected to temperatures of about 150° C. or more during application or cure, $R^4$ may also be a group which thermally deblocks to form an amine. Such elevated application or curing temperatures may be achieved if the formulation is applied as a hot melt or if it is subjected to a post application bake cycle. Thus, $R^4$, together with the nitrogen atom to which it is attached, may form a carbamate group (e.g. $R^2O$—C(=O)—).

Preferred silanes include 4-amino-3,3-dimethylbutyltrimethoxysilane, 4-amino-3,3-dimethylbutyldimethoxymethylsilane, N-methyl-4-amino-3,3-dimethylbutyltrimethoxysilane, aminoisopropoxyethyltrimethoxysilane, aminoisopropoxypropyltrimethoxysilane and corresponding silanes in which the methoxy groups are replaced by ethoxy or a mixture of ethoxy and methoxy groups.

Polymers

The polymer system may be based on any organic or inorganic backbone provided that the polymer has at least two pendant or terminal alkoxysilyl, aryloxysilyl or alkyloximinosilyl groups thereon. Such systems are known. Organic backbone polymer systems include silylated acrylics, silylated polyurethanes, silylated polyethers, silylated polyesters, silated polyolefins and others. Inorganic backbone systems are exemplified by polyorganosiloxanes, for instance RTV silicones. Preferred polymers have an organic backbone such as a polyurethane or a polyether.

Alkoxysilyl groups may be readily provided on a polymer having terminal or pendent active hydrogen groups, i.e. hydroxyl, mercaptan or primary or secondary amino groups, by reacting such polymers with an isocyanatoalkylalkoxysilane such as 3-isocyanatopropyltrimethoxysilane or 3-isocyanatopropyltriethoxysilane. If the active hydrogen group is hydroxyl care should be taken to make sure the hydroxyl is fully endcapped and it is preferred that temperature extremes be avoided and that a hindered or secondary hydroxyl be employed. In an alternative process, polymers having terminal or pendent isocyanate groups may be alkoxysilated by reaction with an aminoalkylalkoxysilanes such as 3-aminopropyltrimethoxysilane, 3-aminopropyltriethoxysilane, 4-amino-3,3-dimethylbutyltrimethoxysilane or 4-amino-3,3-dimethylbutyldimethoxymethylsilane.

The synthesis of typical silane terminated urethane polymers, silylated polyurethanes, and representative formulations prepared therefrom are described in U.S. Pat. Nos. 3,632,557; 4,345,053, and 4,645,816, incorporated herein by reference in their entirety. To prepare isocyanate-terminated polyurethanes, a polyisocyanate and a polyol are reacted using at least a slight mole excess of the —NCO equivalents (groups) with respect to the —OH equivalents (groups). The preferred molar ratio of the NCO to OH is from about 1.2 to 4.0, and more narrowly between 1.3 and 2.0. To prepare a hydroxyl group-terminated polyurethane, the same reactants may be employed using at least a slight mole excess of the hydroxyl equivalents (—OH) (groups) with respect to the —NCO equivalents (groups). For such products the preferred molar ratio of the NCO to OH is from about 0.3 to 0.95, and more narrowly between 0.5 and 0.85, depending on the polyol in use.

Suitable polyisocyanates include any from which polyurethane polymers can be prepared by the customary sequence of reaction with polyol to form a prepolymer. Useful diisocyanates include, for example, 2,4-toluene diisocyanate, 2,6-toluene diisocyanate, 4,4' diphenylmethanediisocyanate, isophorone diisocyanate, dicyclohexylmethane-4,4'-diisocyanate, various liquid diphenylmethane-diisocyanates containing a mixture of 2,4- and 4,4' isomers, Desmodur N® and the like, and mixtures thereof. A preferred isocyanate functional monomer used in the present invention is the mixture of 2,4- and 4,4' diphenylmethane diisocyanates (MDI) which is available from Bayer under the trade name Mondur ML.

The polyols used to prepare an isocyanate or hydroxyl terminated polyurethane have two or more hydroxyl groups. They generally have a number average molecular weight between 250 and 30,000, more narrowly between about 300 to 16,000. They may be polyether polyols, polyester polyols or other polyol compounds. Suitable polyols include polyoxyalkylene (especially polyoxyethylene, polyoxypropylene, and polyoxybutylene) diols, polyoxyalkylene triols, polytetramethylene glycols, polycaprolactone diols and triols, and the like. Other polyol compounds, including tetraols, hexaols, alkoxylated bisphenols or polyphenols, and various sugars and derivatives thereof may also be used, including pentaerythritol, sorbitol, mannitol and the like. Preferred polyols used in the present invention are polypropylene glycols with equivalent weights between about 500 and 10,000, more narrowly between about 500 and 8,000. Mixtures of polyols of various structures, molecular weights and/or functionalities may also be used.

A catalyst may be used in the preparation of the above mentioned polyurethane prepolymers. Suitable catalysts are dialkyltin dicarboxylates, such as dibutyltin dilaurate and dibutyltin acetate, tertiary amines, the stannous salts of carboxylic acids, such as stannous octoate and stannous acetate, and the like. The preferred catalyst is dibutyltin dilaurate.

Silane endcappers suitable in the present invention for the endcapping of isocyanate terminated urethane prepolymers are represented by the general formula:

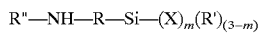

wherein R is a divalent organic group; R' is alkyl or aryl, preferably having 1 to 8 carbon atoms; X is a hydrolyzable alkoxy, aryloxy or alkyloximido group, preferably having from 1 to 4 carbon atoms; and m is an integer from 1 to 3. Group R" is H or an optionally substituted hydrocarbon group. Group R" can have any of a wide variety of structures, such as alkyl, aryl, any of which may be substituted with a amido, acyloxy, halo or other common organic substituent group or have one or more bridges therein. Group R can have any of a wide variety of structures forming a stable bridge between the terminal amino group nitrogen atom and the alkoxysilane group, such as a linear, branched or cyclic alkylene group, an arylene group, an aralkylene group, an alkarylene group, any of which may be optionally substituted, for instance with a hydroxy group, and/or have ether or (poly)sulfide bridge(s) therein. Preferably, however, R is a lower alkylene group having at least 3 carbon atoms therein. A particularly preferred material for use is N-phenyl-gamma-aminopropyl-trimethoxy silane.

Silane endcappers suitable for the endcapping of the active hydrogen terminal atoms bearing urethane prepolymers are represented by the general formula:

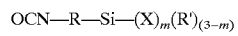

wherein R, R', X and m are as defined above. A number of structures for such isocyanato alkoxysilane compounds are illustrated for example, in columns 4 and 5 of U.S. Pat. No. 4,146,585, incorporated herein by reference. Particularly preferred materials for use according to the present invention are gamma-isocyanatopropyl-triethoxysilane and gamma-isocyanatopropyl-trimethoxysilane.

A urethane prepolymer or other prepolymer having either active hydrogen atoms or isocyanate terminal groups may be reacted in an approximately stoichiometric amount with the above described isocyanate or secondary amino alkoxysilanes, respectively to form a stable polymer having terminal alkoxysilane groups. For instance, to prepare an alkoxysilyl end-capped urethane polymer useful in the invention an isocyanate terminated polyurethane prepolymer may be reacted with an aminoalkylalkoxysilane. A slight excess (about 3 to 5%) of the silane endcapper should be employed in order to ensure a complete reaction of all the terminal isocyanate groups of the prepolymer. The reaction is conducted preferably in the absence of moisture and at a temperature in the range of 60° to 90° C. The reaction is complete when the percent (%) isocyanate is determined to be zero.

To teach the broadness of the invention for other silane cure hybrid systems, the use of silylated polyethers is also exemplified in the examples below.

Formulations

Formulations, useful for instance as sealants, incorporating the silylated polymer can be prepared by thoroughly mixing together the silylated organic or inorganic polymer, an adhesion promoter as described above, and optionally other conventional ingredients, for instance, a cure catalyst, a crosslinker and/or one or more conventional functional adjuvants such as fillers, plasticizers, thixotropes, antioxidants, UV stabilizers, dehydrating agents and other adhesion promoter compounds.

One-part sealant formulations incorporating the above silane terminated urethane polymers or silane terminated polyoxyalkylenes, or other silane cure hybrid systems or mixtures therefrom can be prepared by mixing together the silylated resins and other components. Satisfactory mixing is obtained using a double planetary mixer. Typically, the silylated polymers, fillers, stabilizers and plasticizer are mixed at 80° C. for 60 to 90 minutes in vacuum. After cooling to 50° C., the desired silane adhesion promoter, dehydrating agent and cure catalyst are added and the mixture is stirred, typically for an additional 30 minutes under a blanket of nitrogen.

The sealants may also be formulated as two part formulations. In such case if the silylated polymer and adhesion promoter are kept separate, it may also be practical for the silylated polymer to employ silanol groups in place of the alkoxysilyl, aryloxysilyl or alkyloximinosilyl groups on the silylated polymer.

Typical fillers suitable for formulation of the sealants include reinforcing fillers such as fumed silica, precipitated silica and calcium carbonates. To further improve the physical strength of the formulations, reinforcing carbon black can be used as a main filler, leading to black systems. Several commercial grades of carbon black useful in this invention are available, such as "Corax" products (Degussa). To obtain translucent formulations, higher levels of fumed silica or precipitated silica should be used as the main filler, without carbon black.

Treated calcium carbonates having particle sizes from 0.07 μm to 4 μm are preferred fillers and are available under several trade names, such as: "Ultra Pflex" and "Hi Pflex" from Specialty Minerals; "Winnofil SPM" and "Winnofil SPT" from Zeneca Resins; "Hubercarb 1Qt", "Hubercarb 3Qt" and "Hubercarb W" from Huber and "Kotomite" from ECC. These fillers can be used either alone or in combination. The fillers generally comprise up to 300 parts per 100 parts of the silylated polymer with 80 to 150 parts being the more preferred loading level.

The plasticizers customarily employed in sealants can also be used in the invention to modify the properties and to facilitate use of higher filler levels. Exemplary plasticizers include phthalates, dipropylene and diethylene glycol dibenzoates and mixtures thereof, epoxidized soybean oil and the like. Useful sources of dioctyl and diisodecyl phthalate include those available under the tradenames "Jayflex DOP" and "Jayflex DIDP" from Exxon Chemical. The dibenzoates are available as "Benzoflex 9-88", "Benzoflex 50" and "Benzoflex 400" from Velsicol Chemical Corporation. The soybean oil is available from Union Carbide Corporation as "Flexol EPO". The plasticizer typically comprises up to 100 parts per hundred parts of the silylated polymer with 40 to 80 parts per hundred being preferred.

The sealant formulation can include various thixotropic or anti-sagging agents. This class of additives are typified by various castor waxes, fumed silica, treated clays and polyamides. These additives typically comprise 1 to 10 parts per hundred parts of silylated urethane component with 1 to 6 parts being preferred. Useful thixotropes include those available as: "Aerosil" from Degussa, "Cab-O-Sil" from Cabot, "Castorwax" from CasChem, "Thixatrol" and "Thixcin" from Rheox, and "Disparlon" from King Industries.

UV stabilizers and/or antioxidants can be incorporated into the sealant formulations of this invention in an amount from 0 to 5 parts per hundred parts of silylated urethane polymer with 0.5 to 2 parts being preferred. These materials are available from companies such as Great Lakes and Ciba Specialty Chemicals under the tradenames "Anox 20" and "Uvasil 299 HM/LM" (Great Lakes), and "Irganox 1010," "Irganox 1076," "Tinuvin 770," "Tinuvin 327," "Tinuvin 213" and "Tinuvin 622 LD" (Ciba), respectively.

The aminoalkyl silane adhesion promoter as described above may be incorporated into the composition alone or with other more conventional adhesion promoter compounds such as "Silquest A-1120" silane, "Silquest A-2120" silane, "Silquest A-1110" silane, "Silquest A-1170" silane and "Silquest A-187" silane, all of which are available from Witco's OrganoSilicones Group. Preferably the formulation only includes aminoalkyl adhesion promoter compounds. The adhesion promoter is typically employed at levels of 0.5 to 5 parts per hundred parts of the silylated polymer, with 1.0 to 3.0 parts per hundred parts of polymer being preferred.

Suitable silane condensation cure catalysts are the same as those that have been previously described for preparation of the silylated polymers. The catalysts typically comprise 0.01 to 3 parts per hundred parts of silylated polymer, with 0.01 to 1.0 parts per hundred parts of polymer being preferred.

After mixing, the formulations may be cured by exposure to moisture. For example, sealants typically may be cured at 23° C. and 50% relative humidity for 3 days and at 37° C. and 95% relative humidity for another 4 days.

The invention is illustrated by the following non-limiting examples.

EXAMPLES

Sealants were prepared, conditioned and tested according to standard procedures as follows:

Sealant Formulation

The fillers were dried overnight in an oven (>100° C.). The mixer was blanketed with dry nitrogen and heated to 80° C. The silylated polyurethane (SPU) and the plasticizer, diisononyl phthalate (DINP) and/or diisodecyl phthalate (DIDP), were first mixed well by hand in a disposable can. The fillers ($CaCO_3$), the thixotrope ($SiO_2$), the whitener ($TiO_2$) and the UV stabilizers were added consecutively; mixed by hand, and then placed in the mixer for 5 minutes at a slow speed. After opening the unit to scrape down any material accumulated on the scraper and stirrers the mix was continued at a moderate speed for 1 hour under vacuum. After this time, the sealant appeared smooth and uniform, so that the mixture was cooled down to 50 ° C. and the dehydrating agent (Silquest® A-171™), the adhesion promoter, and the catalyst, dibutyltindilaurate (DBTDL), were added consecutively, dispersing each ingredient into the mixture for 5 minutes under nitrogen. Finally, vacuum was pulled for 5 minutes under stirring and then switched over to nitrogen to transfer sealant into the tube.

Conditioning and Testing

All sealants were drawn down homogeneously as thick films (3 mm). They were left for two weeks at 23° C./50% relative humidity for curing. Then they were tested for tensile strength at break, modulus and elongation at break (ISO 37), for tear resistance (Die C, ISO 34), hardness (ISO 868), and adhesion.

For adhesion, beads of sealant were applied on cleaned (isopropanol wipe) float glass and anodized aluminum, were cured for two weeks at 23° C./50 % RH. Then they were completely immersed in water for one week at ambient, and thereafter tested for their wet adhesion by trying to pull the bead away from the substrate after drying the sample with tissue paper. To evaluate adhesive and cohesive failure the bead was cut down onto the substrate frequently during pulling. The performance was rated 100% cohesive failure (CF) if a complete layer of sealant remained and 100% adhesive failure (AF) if no sealant remained on the substrate. Intermediate rating was allowed for.

The sealants and test results described in Examples 1–4 are representative of comparative and inventive sealant formulations and of test results obtained therefrom.

Example 1

A ready-made silylated polyurethane polymer product of Witton Chem., UK, WSP 725-80 was formulated into sealants as shown in Table 1, where quantities are given in parts by weight. The formulation and testing was performed as described above. Test results are also given in Table 1. Sealant 1A is an invention example. Sealants 1B, 1C and 1D are comparative examples.

TABLE 1

| Sealant | 1A | 1B | 1C | 1D |
| --- | --- | --- | --- | --- |
| Silylated polymer WSP 725-80 | 100 | 100 | 100 | 100 |
| Plasticizer- DINP/DIDP (20/80) | 80 | 80 | 80 | 80 |
| $CaCO_3$ Filler Winnofil SPT/Omya BIR/3 (20/80) | 240 | 240 | 240 | 240 |
| UV stabilizer - Tinuvin 213 & Tinuvin 622LD (1/1) | 2 | 2 | 2 | 2 |
| Thixotrope - Aerosil R 974 | 5 | 5 | 5 | 5 |
| Whitener- Ti-Pure R-902 | 5 | 5 | 5 | 5 |

TABLE 1-continued

| Sealant | 1A | 1B | 1C | 1D |
|---|---|---|---|---|
| Desiccant - A-171 | 1.5 | 1.5 | 1.5 | 1.5 |
| Adhesion promoter † | | | | |
| Silane A | 2.5 | | | |
| A-1120 | | 2.5 | | |
| A-1110 | | | 2.02 | |
| A-1110 | | | | 2.5 |
| Catalyst- SUL 4 (DBTDL) | 0.20 | 0.20 | 0.20 | 0.20 |
| Test Results | | | | |
| Tear strength (N/mm) | 6.19 | 6.92 | 7.03 | 6.71 |
| Tensile strength (MPa) | 1.40 | 1.17 | 1.22 | 1.11 |
| Elongation at break | 741% | 536% | 616% | 531% |
| 100% modulus (MPa) | 0.35 | 0.55 | 0.48 | 0.53 |
| Shore A | 27 | 31 | 30 | 30 |
| Change as compared to Sealant 1A | | | | |
| Elongation at break | — | -28% | -17% | -28% |
| 100% modulus (MPa) | — | 57% | 37% | 51% |
| Shore A | — | 15% | 11% | 11% |
| Wet adhesion performance on Aluminium and Glass | | | | |
| Alu - wet | 100% CF | 100% CF | 100% CF | 100% CF |
| Glass - wet | 100% CF | 100% AF | 90% AF | 100% AF |

†Adhesion promoter silanes:
Silane A, 4-amino-3,3-dimethylbutyltrimethoxysilane
Silquest ® A-1110, gamma-aminopropyltrimethoxysilane
Silquest ® A-1120, N-beta-(aminoethyl)-gamma-aminopropyltrimethoxysilane Example 2

A mixture of 464.2 g of a conventional polyoxypropylene polyol, having a specified hydroxyl number of 26.8 and correspondingly a molecular weight of 4187 (PolyG 4000, Lyondell); 41.6. g of 2,4'/4,4'-diphenylmethane diisocyanate (2,4'/4,4'-MDI, Mondur ML, Bayer), giving a NCO/OH ratio of 1.5; and 60 ppm dibutyltin dilaurate (DBTDL) was prepared and held under constant stirring (30 rpm) at 70–75° C. for about 3 hours to reduce its NCO content to approximately 0.8% wt. Then this isocyanate terminated polyurethane prepolymer was reacted with 24.7 g of N-phenyl-gamma-aminopropyltrimethoxysilane to form a silylated polyurethane polymer. The reaction was held at 70–75° C. until the NCO content was zero.

The silylated polyurethane polymer was formulated into a sealant and tested as described above. Ingredients and test results are given in Table 2, where sealant 2A is a comparative example and sealant 2B is an invention example.

TABLE 2

| Sealant | 2A | 2B |
|---|---|---|
| Silylated polymer | 100 | 100 |
| Plasticizer-DIDP | 40 | 40 |
| CaCO₃ Filler Winnofil SPT/Omya BlR/3 (40/60) | 100 | 100 |
| UV stabilizer-Tinuvin 213 & Tinuvin 622LD (1/1) | 2 | 2 |
| Thixotrope Aerosil R 974 | 6 | 6 |
| Whitener-Ti-Pure R-902 | 2 | 2 |
| Desiccant A-171 | 1 | 1 |
| Adhesion promoter: | | |
| A-1120 | 2 | — |
| Silane A | — | 2 |
| Catalyst-SUL 4 (DBTDL) | 0.15 | 0.15 |
| Test Results | | |
| Tear strength (N/mm) | 5.8 | 5.6 |
| Tensile strength (MPa) | 1.47 | 1.78 |
| Elongation | 213% | 316% |
| 100% modulus (MPa) | 0.78 | 0.63 |
| Shore A | 39 | 34 |
| Changes as compared to 2B | | |
| Elongation | -32% | — |
| 100% modulus (MPa) | 24% | — |
| Shore A | 15% | — |
| Wet adhesion performance on Aluminium and Glass | | |
| Alu-wet | 85% CF | 100% CF |
| Glass-wet | 100% AF | 100% CF |

Example 3

A ready-made silylated polyether polymer of Kaneka, Japan, sold under the name MS 203 H was formulated into sealants and tested as described above. Ingredients and test results are given in Table 3. Sealant 3A is a comparative example and sealant 3B is an invention example.

TABLE 3

| Sealant | 3A | 3B |
|---|---|---|
| Silylated polymer MS 203H | 100 | 100 |
| Plasticizer-DIDP | 80 | 80 |
| CaCO₃ Filler-Winnofil SPT/Omya BlR/3 (20/80) | 240 | 240 |
| UV stabilizer-Tinuvin 213 & Tinuvin 622LD (1/1) | 2 | 2 |
| Thixotrope-Aerosil R 974 | 5 | 5 |
| Whitener-Ti-Pure R-902 | 5 | 5 |
| Desiccant-A-171 | 1.5 | 1.5 |
| Adhesion promoter | | |
| A-1120 | 2.5 | |
| Silane A | | 2.5 |
| Catalyst-SUL 4 (DBTDL) | 0.2 | 0.2 |
| Test Results | | |
| Tear strength (N/mm) | 4.4 | 4.74 |
| Tensile strength (MPa) | 0.81 | 0.92 |
| Elongation | 658% | 865% |
| 100% modulus (MPa) | 0.36 | 0.27 |
| Shore A | 19 | 17 |
| Changes as compared to 3B | | |
| Elongation | -24% | |
| 100% modulus (MPa) | 33% | |
| Shore A | 12% | |
| Wet adhesion performance on Aluminium and Glass | | |
| Alu-wet | 100% CF | 100% CF |
| Glass-wet | 100% AF | 100% CF |

Example 4

Sealant formulations were prepared as in Example 2, except that the adhesion promoters and amounts were as shown in Table 4 where formulation 4A is an invention example and 4B is a comparative example.

TABLE 4

| Sealant | 4A | 4B |
|---|---|---|
| Adhesion promoter‡ | | |
| Silane B | 2.31 | |
| A-2120 | | 2.32 |
| Tear strength (N/mm) | 6.12 | 7.74 |
| Tensile strength (MPa) | 1.32 | 1.38 |

TABLE 4-continued

| Sealant | 4A | 4B |
| --- | --- | --- |
| Elongation | 902% | 825% |
| 100% modulus (MPa) | 0.33 | 0.46 |
| Shore A | 21 | 29 |
| Changes as compared to 4A | | |
| Elongation | — | -9% |
| Modulus | — | 39% |
| Shore A | — | 38% |
| Alu-wet | 100% CF | 100% CF |
| Glass-wet | 100% CF | 100% AF |

‡Adhesion Promoters:
Silane B, 4-amino-3,3-dimethylbutyldimethoxymethylsilane
Silquest @ A-2120, N-beta-(aminoethyl)-gamma-aminopropylmethyldimethoxysilane The data in Tables 1–4 shows distinctly the impact of the amino silane adhesion promoter additives of the invention on the discussed properties, in particular increased elongation and lowered rigidity and hardness relative to the known adhesion promoters used in the comparative examples. Moreover the novel silane adhesion promoter shows comparable to superior adhesion promotion in this evaluation.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto. It should also be understood that, in addition to those combinations recited in the dependent claims, all other possible combinations of the features of the dependent claims are considered to be specific aspects of the invention.

What is claimed is:

1. A composition comprising:
   a) a silylated polymer selected from the group consisting of silylated acrylics, silylated polyurethanes, silylated polyethers, silylated polyesters, silylated polyolefins and mixtures thereof, said silylated polymer having terminal or pendant hydrolyzable alkoxysilyl, aryloxysilyl or alkyloximinosilyl groups thereon; and
   b) a silane adhesion promoter of the formula:

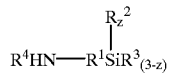

where $R^1$ is a branched or cyclic alkylene group, an arylene group or an alkarylene group, any of which may be optionally interrupted by one or more ether oxygen atoms or a (poly)sulfide bridge, provided that $R^1$ has at least 4 carbon atoms; $R^2$ is an alkyl, aryl or alkaryl radical having 1 to 6 carbons; $R^3$ is a $C_3$ to $C_6$ alkoxy group or a $C_1$ to $C_5$ ketoximato group; $R^4$ is hydrogen, a hydrocarbon group, which may optionally be substituted, or a group which will thermally deblock to form an amine group containing the nitrogen atom to which it is attached; and z is 0 or 1.

2. A composition as in claim 1 wherein $R^1$ is selected from the group consisting of 1,3-butylene; 1,2-butylene; 2,2-dimethyl-1,3-propylene; 3-methylbutylene; 3,3-dimethylbutylene; 2-ethylhexylene; 1,4-diethylenephenylene; 3-phenyl-1,3-propylene; 1,4-cyclohexylene; 1,4-diethylenecyclohexylene; 1,2-phenylene; 1,3-phenylene; 1,4-phenylene; 2-methyl-1,4-phenylene; groups of the formula:

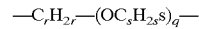

where q is 1–50, r and s are integers of 2–6 and at least one —$C_rH_{2r}$— or —$OC_sH_{2s}$— group thereof is branched; and groups of the formula:

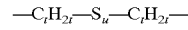

where t is 2–16, u is 1–8 and at least one —$C_tH_{2t}$— group thereof is branched.

3. A composition as in claim 1 wherein $R^1$ is a branched alkylene group of 4–8 carbon atoms.

4. A composition as in claim 1 wherein $R^2$ is methyl, ethyl, propyl, isopropyl, butyl, hexyl, phenyl, cyclohexyl, or tolyl.

5. A composition as in claim 1 wherein $R^3$ is methoxy, ethoxy, isopropoxy, n-propoxy, phenoxy, 2-phenylethoxy, dimethylketoximo, methyl ethyl ketoximo or diethylketoximo.

6. A composition as in claim 1 wherein $R^4$ is hydrogen, methyl, ethyl, 2-hydroxyethyl, 2-aminoethyl, propyl, 3-hydroxypropyl, 3-aminopropyl, butyl, cyclohexyl, phenyl, methylphenyl, 2-cyanoethyl, isopropoxyethyl, $R^2$—C(=O)— or $R^2O$—C(=O)—).

7. A composition as in claim 1 wherein $R^1$ is a branched alkylene group, $R^3$ is methoxy, $R^4$ is H, methyl or ethyl, and either $R^2$ is a methyl group or z is 0.

8. A composition as in claim 1 further comprising a silane condensation cure catalyst.

9. A composition as in claim 1 wherein said silylated polymer has an organic backbone.

10. A composition as in claim 1 wherein the silylated polyurethane is a reaction product of an isocyanate terminated prepolymer and a silane of the formula

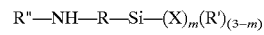

wherein R is a divalent organic group; R' is alkyl or aryl; R" is H or an optionally substituted hydrocarbon group, X is a hydrolyzable alkoxy, aryloxy or alkyloximido group; and m is an integer from 1 to 3.

11. A composition as in claim 1 wherein the silylated polyurethane is a reaction product of a prepolymer terminated with an active hydrogen group and a silane of the formula:

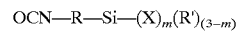

wherein R is a divalent organic group; R' is alkyl or aryl; X is a hydrolyzable alkoxy, aryloxy or alkyloximido group; and m is an integer from 1 to 3.

12. A composition as in claim 1 wherein the adhesion promoter is selected from the group consisting of 4-amino-3,3-dimethylbutyltrimethoxysilane, 4-amino-3,3-dimethylbutyldimethoxymethylsilane, N-methyl-4-amino-3,3-dimethylbutyltrimethoxysilane, aminoisopropoxyethyltrimethoxysilane, aminoisopropoxypropyltrimethoxysilane, 4-amino-3,3-dimethylbutyltriethoxysilane, 4-amino-3,3-dimethylbutyldiethoxymethylsilane, N-methyl-4-amino-3,3-dimethylbutyltriethoxysilane, aminoisopropoxyethyltriethoxysilane, and mixtures thereof.

13. A composition as in claim 1 further comprising at least one of a silane condensation cure catalyst, a crosslinker, a filler, a plasticizer, a thixotrope, an antioxidant, a UV stabilizer, and a dehydrating agent.

14. A composition as in claim 1 wherein said silylated polymer has a polyorganosiloxane backbone.

15. A composition as in claim 1 wherein said silylated polymer has a plurality of alkoxysilyl groups thereon.

16. A composition prepared by mixing a silylated polymer and an adhesion promoter, the silylated polymer being selected from the group consisting of silylated acrylics, silylated polyurethanes, silylated polyethers, silylated polyesters, silylated polyolefins and mixtures thereof and having at least two groups thereon selected from alkoxysilyl, aryloxysilyl, alkyloximinosilyl and silanol groups and the adhesion promoter being a silane adhesion promoter of the formula:

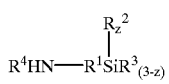

wherein:

$R^1$ is a branched or cyclic alkylene group, an arylene group or an alkarylene group, any of which may be optionally interrupted by one or more ether oxygen atoms or a (poly)sulfide bridge, provided that $R^1$ has at least 4 carbon atoms; $R^2$ is an alkyl, aryl or alkaryl radical having 1 to 6 carbons; $R^3$ is a $C_1$ to $C_6$ alkoxy group or a $C_3$ to $C_5$ ketoximato group; $R_4$ is hydrogen, a hydrocarbon group, which may optionally be substituted, or a group which will thermally deblock to form an amine group containing the nitrogen atom to which it is attached; and z is 0 or 1.

17. A composition as in claim 1 wherein $R^4$ is hydrogen or a hydrocarbon group, which may be optionally substituted.

18. A composition as in claim 1 wherein $R^4$ is a group which will thermally deblock to form an amine group containing the nitrogen atom to which it is attached.

* * * * *